United States Patent [19]

Hauser

[11] 4,274,249
[45] Jun. 23, 1981

[54] HAY HARVESTING MACHINE
[75] Inventor: Hans-Ulrich Hauser, Niederweningen, Switzerland
[73] Assignee: Bucher-Guyer AG Maschinenfabrik, Niederweningen, Switzerland
[21] Appl. No.: 94,967
[22] Filed: Nov. 16, 1979
[30] Foreign Application Priority Data
Nov. 21, 1978 [CH] Switzerland ..................... 11901/78
[51] Int. Cl.³ ............................................ A01D 79/00
[52] U.S. Cl. ................................................... 56/370
[58] Field of Search .................. 56/370, 366, 377, 192
[56] References Cited
U.S. PATENT DOCUMENTS
4,015,412 4/1977 Reber ..................................... 56/370
FOREIGN PATENT DOCUMENTS
2527646 1/1976 Fed. Rep. of Germany ............. 56/370
2307458 11/1976 France ....................................... 56/370

Primary Examiner—Jay N. Eskovitz
Attorney, Agent, or Firm—Werner W. Kleeman

[57] ABSTRACT

A hay harvesting machine containing a rake wheel having a housing formed by an upper housing portion connected non-rotatably with a vertical upright shaft and a lower housing portion rotatably mounted at the upright shaft. The lower housing portion is revolvingly driven by means of a gear drive, typically bevel gearing. In the lower housing portion there are mounted tine supports so as to be pivotal about their lengthwise axis, these tine supports additionally being pivoted about a pivot shaft or axis extending transversely with respect to their lengthwise axis. This pivot axis is located in a plane which is approximately perpendicular to the upright shaft. The tine supports extend in tangential direction and, viewed in the direction of revolving motion thereof, extend rearwardly. For swath formation the tine supports are retained in a pivotal position where they are guided by means of a control head or follower in a control track or cam at the upper housing portion. This control track is located in a plane extending essentially perpendicular to the upright or vertical shaft. For windrowing and turning the cut grass or material the tine supports are pivoted about the pivot shaft or axis, so that they come out of engagement with the control track or cam. In this pivotal position the tine supports are secured against rotation about their lengthwise axis.

15 Claims, 4 Drawing Figures

HAY HARVESTING MACHINE

CROSS-REFERENCE TO RELATED CASES

This application is related to my commonly assigned, copending U.S. application Ser. No. 094,968, filed Nov. 16, 1979, entitled "Hay Harvesting Machine," and my copending U.S. application Ser. No. 094,966, filed Nov. 16, 1979 entitled "Hay Harvesting Machine".

BACKGROUND OF THE INVENTION

The present invention relates to a new and improved construction of hay harvesting machine.

Generally speaking, the hay harvesting machine of the present development is of the type comprising at least one rake wheel revolving about an upright or vertical shaft. The rake wheel contains a plurality of tine supports equipped with rake tines. The tine supports are arranged to be rotatable about their lengthwise axis at a driven rotatable housing element mounted at the upright shaft so as to be rotatable. The tine supports can be brought from a first position, where they are operatively connected with a control track or cam which is non-rotatably connected with the upright shaft for rotation of the tine supports, into a second position where they are decoupled from such control track and can be secured against rotation. The tine supports can be arrested in each of both positions.

With a heretofore known hay harvesting machine of this type, as disclosed for instance in German Pat. No. 1,757,720, the tine supports extend approximately in radial direction away from the upright or vertical shaft. These tine supports, for swathing purposes, are operatively connected with a control cam extending at the same spacing about the upright shaft. The control cam possesses, in the direction of the upright shaft, an ascending and again descending portion or section for the purpose of lifting the rake tines. Owing to the space which is occupied by the control cam in the direction of the upright shaft, the structural height of the machine, and thus, also its weight is correspondingly increased. This increased weight requires an appropriate dimensioning of the equipment. Due to the relatively large structural height the use of this machine at the region of hedges, bushes and trees having low slung branches is rendered more difficult, if not made impossible.

A further drawback of this state-of-the-art proposal resides in the fact that with the tine supports uncoupled from the control cam there are required relatively complicated measures, in order to retain the tine supports in their decoupled position, and additionally, to secure them against rotation.

SUMMARY OF THE INVENTION

Therefore, with the foregoing in mind, it is a primary object of the present invention to provide a new and improved construction of a hay harvesting machine which is not afflicted with the aforementioned drawbacks and limitations of the prior art hay harvesting machine discussed above.

Another and more specific object of the present invention aims at providing a new and improved construction of hay harvesting machine of the previously mentioned type, whose structural height and whose weight is retained as low as possible, and wherein in a most simple manner the tine supports can be selectively positioned and arrested in their momentary selected position.

Yet a further significant object of the present invention is directed to a new and improved construction of hay harvesting machine which is relatively simple in design, economical to manufacture, extremely reliable in operation, not readily subject to breakdown or malfunction, requires a minimum of maintenance and servicing, possesses low weight and compact structural height, and generally avoids the disadvantages heretofore discussed with the state-of-the-art equipment. Now in order to implement these and still further objects of the invention, which will become more readily apparent as the description proceeds, the hay harvesting machine of the present development is manifested by the features that the control track extends in a plane situated essentially perpendicular to the upright or vertical shaft. The tine supports extending approximately in tangential direction are mounted pivotably in the rotatable housing portion about a pivot shaft or axis extending transversely with respect to the lengthwise axis of the related tine support, this pivot shaft or axis being positioned practically perpendicular to the upright shaft.

Since the control track or cam is located in a plane, extending at least approximately perpendicular to the upright shaft, the control track or cam only has a small or insignificant affect upon the structural height of the machine. The tine supports can be selectively brought into engagement and out of engagement with the control track or cam by pivoting or rocking the tine supports. The arresting and securing of the tine supports in their pivotal position, where they are decoupled from the control track, can be accomplished with simple means.

The control track is preferably arranged above the tine supports. This renders possible a compact construction of the machine.

It is additionally of advantage, in the case of a hay harvesting machine provided with tine supports extending rearwardly, viewed in the rotational direction, to design the control track or cam such that it has a first track portion or section which is essentially coaxially arranged with respect to the upright shaft and a second track portion or section which extends, in relation to the first track portion, at a greater spacing from the upright shaft. Due to this design of the control track or cam the control elements of the tine supports, during their revolving movement along the control track, are only subjected to gradual or gentle directional changes, however not forced to perform pronounced deflections or turning movements. This, in turn, has a beneficial effect in terms of lower wear of the control track and the control elements guided therein.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
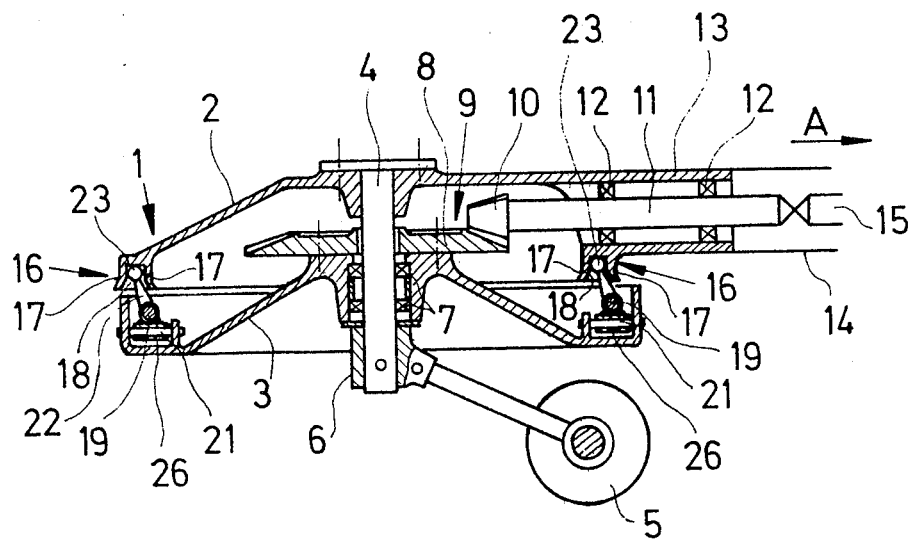
FIG. 1 is a vertical sectional view through a rake wheel of a hay harvesting machine constructed according to the invention.
Figure 2:
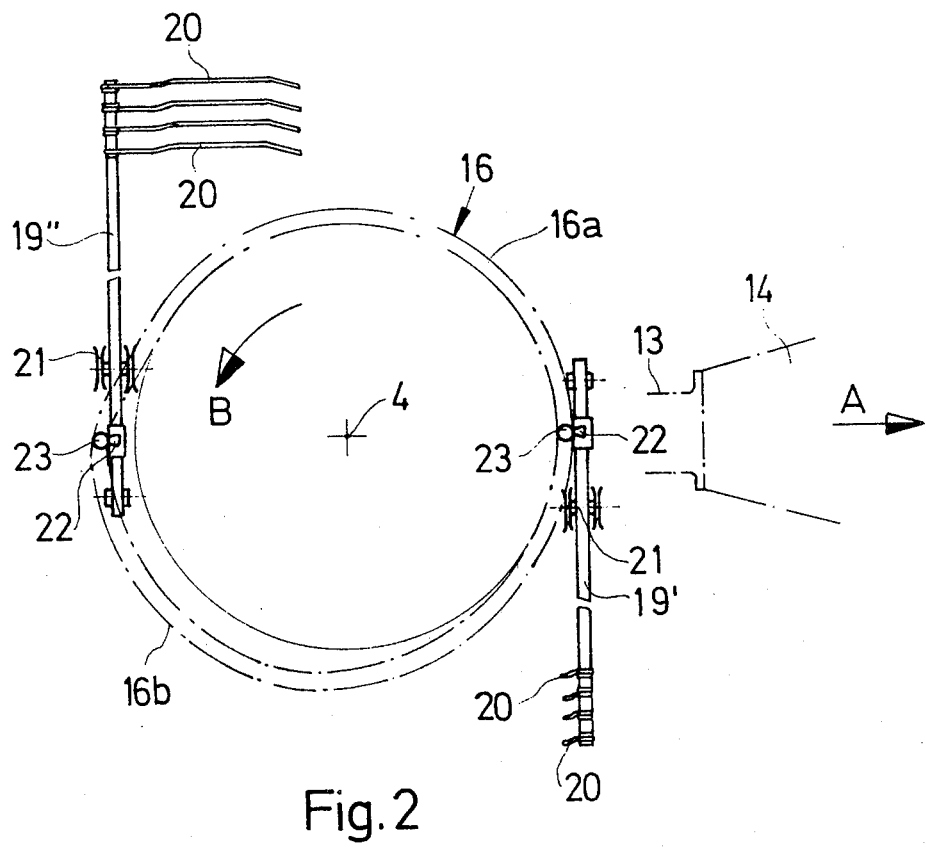
FIG. 2 is a schematic top plan view of the control track or cam working with two tine supports or support members.

Describing now the drawings, and as particularly well seen by referring to FIG. 1, there is shown therein the rake wheel of a hay harvesting machine which comprises an essentially closed housing 1. This housing 1 is formed by an upper substantially bowl-shaped and downwardly open housing portion or part 2 and a lower, likewise substantially bowl-shaped and upwardly open housing portion or part 3. The upper housing portion 2 is rigidly or non-rotatably, i.e. stationarily connected in any suitable manner, for instance by means of threaded bolts, screws or other suitable or equivalent fastening expedients, with an upright, approximately vertical shaft 4. This upright shaft 4 bears upon the ground by means of a support wheel 5. The support wheel 5 is mounted by means of a hub portion 6 at the lower end of the upright shaft 4. The lower housing portion 3 is mounted by ball bearings 7 rotatably at the upright shaft 4. The rotatable, lower housing portion 3 is revolvingly driven in the direction of the arrow B (FIG. 2). For this purpose there is secured a suitable drive at the lower housing portion 3, here shown in the form of a bevel gear 8 of a bevel gear drive 9. This bevel gear 8 can also be formed of one-piece with the lower housing portion 3. Meshing with the bevel gear 8 is a second bevel gear 10 which is seated upon a drive shaft 11. This drive shaft 11 is rotatably mounted by means of ball bearings 12 in a substantially channel-shaped connection element 13 of the upper housing portion 2. As best seen by referring to FIGS. 1 and 2 and schematically shown, the rake wheel is coupled by means of this connection piece or element 13 with a coupling portion 14 of a not particularly further shown, but standard traction vehicle, typically for instance a tractor. This traction vehicle pulls the rake wheel in the direction of the arrow A. The drive shaft 11 is coupled with the power takeoff shaft 15 of the traction vehicle, so that the lower housing portion 3 can be revolvingly driven, in conventional fashion, by the traction vehicle.

The upper housing portion 2 is provided at its lower side with a closed control track or cam 16 or equivalent structure which extends along the circumference of the upper housing portion 2. This control track or cam 16 has been shown in chain-dot or phantom lines in FIG. 2. Control track or cam 16 is located in a plane extending essentially perpendicular to the upright shaft 4, i.e. extends approximately horizontally, and is formed by a downwardly open, substantially U-shaped structural or profile element, as particularly well recognized by referring to FIG. 1. By reverting to FIG. 2 it will be seen that this control track or cam 16 has a first track section or portion 16a which extends essentially coaxially with respect to the upright shaft 4 and merges with a second track section or portion 16b extending at a greater spacing from the upright shaft 4 than the aforementioned first track section or portion 16a. By means of this second track section or portion 16b the control track or cam 16 has imparted thereto a bowed-out configuration. The flanges 17 of the substantially U-shaped control track 16 are provided with inclined deflection or control surfaces 18, whose function will be explained more fully hereinafter.

The control track or cam 16 serves, in known manner, for rocking or pivoting the tine supports 19. These tine supports 19 carry at their free end rake tines or prongs 20 or equivalent structure and are rotatable about their lengthwise axis in a manner which will be described more fully hereinafter and are secured, about a pivot shaft or axis 21, pivotably at the lower housing portion 3. The tine supports 19 extend approximately tangentially with respect to the revolving path of travel of their attachment point at the housing portion 3 and, viewed in the direction of rotation B, extend rearwardly. The tine supports 19 are arranged at a mutual spacing along the periphery or circumference of the housing portion 3. Although in the showing of FIGS. 1 and 2 there have only been illustrated two tine supports 19, it is to be expressly understood that in practice a larger number of such type tine supports is usually provided, for instance, six or eight tine supports. Rigidly non-rotatably connected with each tine support 19 is a control arm 22 carrying a control head or follower 23 which is guided in the control track or cam 16 at the upper housing portion 2. With the control heads 23 engaging into the control track or cam 16 the tine supports 19, during their revolving or orbiting motion, are rocked about their lengthwise axis in a manner still to be described more fully hereinafter.

Figure 3:
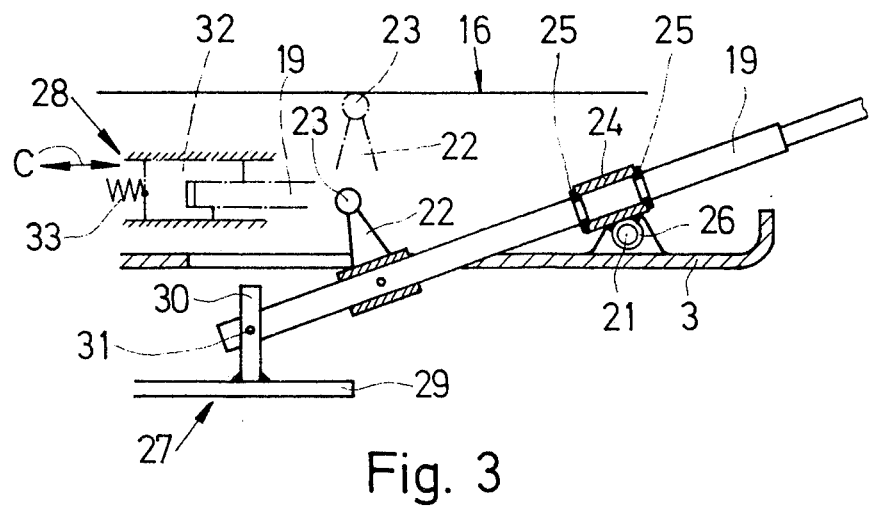
FIG. 3 schematically illustrates in side view, partially in section, a tine support.
Figure 4:
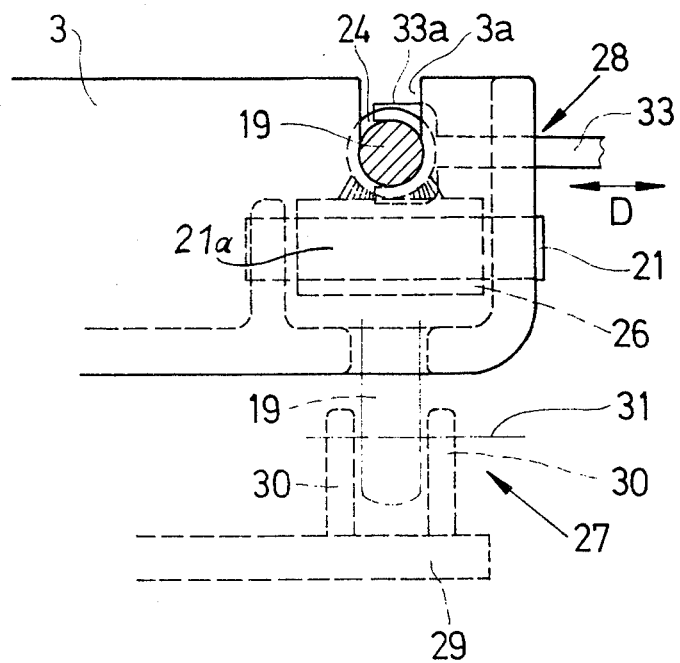
FIG. 4 is a front view of part of the lower housing portion looking in the direction of the lengthwise axis of a tine support.

The construction of the bearing or support arrangement of the tine supports 19 will be explained at this point based upon the illustration of FIGS. 3 and 4. FIG. 3 purely schematically shows, and while conveniently omitting certain of the elements not important for understanding the basic features and concepts of the invention, a tine support in side view, whereas FIG. 4 shows a front view of part of the lower housing portion 3 looking in the direction of the lengthwise axis of the tine support 19 which is mounted at such portion. In FIG. 4 the end of the tine support 19, carrying the rake tines 20, has been cut away and the control arm 22 together with the control head or follower 23 has been omitted to improve clarity in the illustration. As clearly recognized by reverting to such FIGS. 3 and 4, the tine support 19 is rotatably mounted in a substantially hollow cylindrical bearing bushing 24 about its lengthwise axis. By means of the securing rings 25 or equivalent structure, best seen by referring to FIG. 3, the tine support 19 is however secured against any shifting or displacement in the direction of its lengthwise axis. The bearing bushing 24 is welded or otherwise appropriately connected with a further bearing bushing 26, whose lengthwise axis extends approximately at right angles to the lengthwise axis of the first bearing bushing 24. The second bearing bushing 26 is mounted upon a bolt 21a forming the pivot shaft or axis 21 of the tine support 19. The bolt 21a is retained in the lower housing portion 3. The bolt 21a extends perpendicular to the lengthwise axis of the tine support 19 and is located in a plane which is approximately perpendicular to the upright shaft 4. The bearing bushing 26 can be rotatably seated upon the bolt 21a or can be fixedly connected therewith, and the bolt 21a is then accordingly fixedly or rotatably retained in the housing portion 3.

The tine support 19 can be rocked to-and-fro about this pivot shaft 21 between two pivotal positions. In its upper pivotal position, where it has been illustrated in FIG. 3 in phantom lines and in full lines in FIG. 4, the control head or follower 23 engages with the control track or cam 16, as the same has been schematically shown in FIG. 3. In this upper pivotal position there thus prevails a control connection between the control track or cam 16 and the tine support 19. In its lower pivotal position, shown in FIG. 3 with full lines and in FIG. 4 with phantom lines, the control head or follower 23 is out of engagement with the control track or cam 16, so that the control track 16 does not affect the movement of the revolving tine support 19. In order to arrest the tine support 19 in its two pivotal positions there are provided two arresting devices or arresting means 27 and 28 arranged at different elevational positions, i.e. above one another and co-rotating along with the rotatable lower housing portion 3.

The lower arresting device 27, serving for fixedly retaining the tine support 19 which has been decoupled from the control track or cam 16, will be seen to comprise two flanges 30 secured to a support or carrier member 29 connected in any suitable, and therefore not particularly illustrated, fashion with the housing portion 3. The flanges 30 extend parallel to one another and are arranged at a mutual spacing from one another. Both of the flanges 30 receive therebetween the tine support 19 which is therefore straddled by these flanges 30. By means of an arresting pin 31 or equivalent structure, only schematically shown in FIG. 4, which is retained in both flanges 30 and piercingly extends through the tine support 19, this tine support 19 is retained in its pivotal position and at the same time is secured against a rotation about its lengthwise or longitudinal axis.

The upper arresting device or arresting means 28, which has assigned the task of retaining the tine support 19 in its upper pivotal or rocked position, where it is operatively connected with the control track or cam 16, has been shown differently constructed in each of FIGS. 3 and 4. With the proposal of FIG. 3 the arresting device 28 possesses an arresting element 32, shiftable in the direction of the arrow C, this arresting element 32 can be biased or urged, by means of a compression or pressure spring 33, into its arresting or blocking position illustrated in FIG. 3. In this arresting or blocking position the merely schematically illustrated arresting element 32 engages over the end of the tine support 19 and retains such against rocking about the pivot shaft or axis 21. The arresting element 32 however enables rotation of the tine support 19 about its lengthwise or longitudinal axis. For releasing the arresting action the arresting element 32 is shifted back, against the action of the compression spring 33, so that the tine support 19 is released. In order to place the arresting element 32 into engagement with the related tine support 19, the arresting element 32 either must be shifted back manually or by the rocking or pivoting back tine support 19.

The construction of arresting device 28 illustrated in FIG. 4 will be seen to comprise an arresting element 33 which is displaceable in the direction of the arrow D within the housing portion 3. This arresting element 33 is constructed to be bifurcated or fork-shaped at its front end 33a. As clearly evident from the showing of FIG. 4, the arresting element 33, located in its arresting or blocking position, engages by means of its bifurcated or fork-shaped end 33a with the tine support 19 which piercingly extends through a recess 3a in the lower housing portion 3 and secures such tine support 19 against rocking about the pivot shaft 21. Rotation of the tine support 19 about its lengthwise axis is however possible. To release the tine support 19 the arresting element 33 must be shifted back in the direction of the arrow D.

Depending upon the pivotable position of the tine supports 19 the rake or raking wheel either serves for swathing or for windrowing and turning the grass or legume. If the tine supports 19 assume their upper pivotal position, where they are retained by the arresting device or means 28 and their control heads or followers 23 engage into the control track or cam 16, then the tine supports 19 and the rake tines 20 are controlled such that there is accomplished the formation of a swath. As long as with the tine supports 19 revolving the control head or follower 23 is guided in the circular-shaped portion or section 16a of the control track 16, the related tine support 19 will be rocked into its rake position where the rake tines 20 extend downwardly towards the ground, assuming an essentially vertical position, as the same has been illustrated in FIG. 2 by the tine support 19'. The cut material which is reposing upon the ground is raked together into a swath in known manner by the action of the rake tines or prongs 20 which are located in their rake or raking position.

Now if the control heads or followers 23 arrive at the region of the bowed-out control track section or portion 16b, then there is accomplished a pivoting or rocking of the tine supports 19 about their lengthwise axis, whereby the rake tines 20 are raised from the ground and rocked upwardly, as the same has been illustrated in FIG. 2 by the tine support designated by reference character 19". In this upwardly rocked or pivoted position, where the rake tines 20 extend opposite to the direction of rotation B, the rake tines 20 are out of engagement with the previously formed swath. During the passage of the corresponding control head or follower 23 through the control track section or portion 16b there is accomplished a gradual pivoting back of the related tine support or support member 19 into its raking position, where it is then finally pivoted back as soon as it again arrives at the region of the control track or cam section 16a. Since by virtue of the bowed-out construction of the control track or cam 16 the control heads or followers 23 can gradually travel into the control track section or portion 16b, which has a greater spacing from the upright or vertical shaft 4 in relation to the track section 16a, the control heads or followers 23 guided in the control track or cam 16 are not forced to perform an unfavorable directional reversal or change in their movement which would lead to wear of such control head or followers and the control track, rather only experience a gradual or gentle directional change. The same is also of course true when the control heads or followers 23 depart out of the control track section or portion 16b. In this way it is possible to beneficially reduce the wear of the control track or cam 16 and the control heads or followers 23.

For windrowing and turning the grass or legume, the tine supports 19 are rocked into their lower pivotal position where they are no longer coupled with the control track or cam 16. In this lower pivotal position the tine supports 19, as already explained, are secured by the arresting device or means 27 both against rocking or pivoting about the pivot shaft 21 and also against rotation about their lengthwise axis. During the revolving movement of the tine supports 19 the rake tines 20 remain in their approximately vertical, downwardly directed position. The upright shaft 4 is inclined in known manner such that the tips of the rake tines or prongs 20 revolve in a plane which is inclined downwardly towards the front with respect to the direction of travel.

Upon rocking of the tine supports or support members 19 out of their lower pivotal position into their upper pivotal position the deflection or control surface 19 provided at the flanges 17 of the control track or cam 16 ensure that the control heads or followers 23 will be faultlessly and positively introduced into engagement with the control track or cam 16.

It should be understood that the arresting devices 27 and 28 for the tine supports 19 also can be constructed differently than shown by way of example herein. Thus, for instance, it is particularly advantageous to provide a device by means of which with one manual operation all of the tine supports can be collectively rocked or pivoted and arrested, something facilitating conversion of the machine from its "swathing" mode into its "windrowing and turning" mode.

The control track or cam 16 instead of being constructed, as shown, as a substantially U-shaped sectional or profile element, also can be designed as a substantially L-shaped sectional or profile element which is downwardly open and open to one side. Also, when using a substantially L-shaped sectional element the flange directed downwardly preferably is provided with a deflection or control surface for the control heads or followers 23. In contrast to a U-shaped sectional element the provision of the proposed L-shaped sectional element is associated with the drawback that for the faultless guiding of the control heads or followers 23 in the control track or cam 16 there must be provided additional measures.

The construction of the housing 1 as a closed housing affords the advantage that the components which are mounted within the housing 1 are protected against contamination or soiling and there is prevented any impairment of the mode of operation by the penetration of foreign bodies from the outside into the housing interior. Additionally, with a closed construction of the lower housing portion 3 it is possible to use this housing portion 3 as an oil vat or sump. By virtue of the rotation of this lower housing portion 3 the oil is propelled outwardly and partially also upwardly, something which ensures for a faultless lubrication of the tine support bearings or support arrangements and also the control heads or followers 23 guided in the control track or cam 16.

The lower housing portion 3 also can have imparted thereto the shape of a downwardly open spoke wheel. In such case the tine supports 19 must be secured at the spoke arms of the spoke wheel.

In practice it has been frequently found to be advantageous to arrange two or more rake wheels of the previously described type next to one another. These rake wheels can be driven so as to rotate in the same directional sense or can rotate in pairs in opposite directional sense.

While there are shown and described present preferred embodiments of the invention, it is to be distinctly understood that the invention is not limited thereto, but may be otherwise variously embodied and practiced within the scope of the following claims. Accordingly,

What I claim is:

1. A hay harvesting machine comprising:
    at least one rake wheel revolving about a vertical axis;
    said rake wheel comprising:
        a substantially upright shaft defining said vertical axis;
        a driven rotatable housing portion;
        means for rotatably mounting said driven rotatable housing portion for rotation at said upright shaft;
        a plurality of tine supports each having a lengthwise axis;
        said tine supports each being provided with rake tines;
        each of said tine supports being arranged at the rotatable housing portion so as to be rotatable about their lengthwise axis;
        control track means non-rotatably connected with said upright shaft;
        said tine supports being operatively connected with said control track means;
        said tine supports being movable out of a first position where they are operatively connected with said control track means into a second position where they are uncoupled from said control track means and secured against rotation;
        means for selectively arresting the tine supports in each of said positions;
        said control track means extending in a plane disposed essentially perpendicular to said upright shaft;
        said tine supports extending approximately in tangential direction;
        pivot shaft means extending substantially transversely with respect to the lengthwise axis of the tine supports and disposed practically perpendicular to the upright shaft; and
        said tine supports being pivotably mounted by said pivot shaft means at said rotatable housing portion.

2. The hay harvesting machine as defined in claim 1, wherein:
    said control track means is arranged above said tine supports.

3. The hay harvesting machine as defined in claim 2, wherein:
    said tine supports extend rearwardly with respect to the direction of rotation;
    said control track means having a first track portion extending substantially coaxially with respect to the upright shaft and a second track portion which is arranged, in relation to the first track portion, at a greater spacing from the upright shaft.

4. The hay harvesting machine as defined in claim 1, further including:
    a control element provided for each tine support;
    each tine support being connected non-rotatably with its control element;
    said control element being guided in the first pivotal position of the tine support in the control track means.

5. The hay harvesting machine as defined in claim 4, wherein:
    said control track means is formed by a downwardly open substantially U-shaped sectional element.

6. The hay harvesting machine as defined in claim 4, wherein:
    said control track means is formed by a substantially L-shaped sectional element which is downwardly open and open to one side thereof.

7. The hay harvesting machine as defined in claim 5, wherein:
    said control track means has downwardly directed flange means extending in the direction of the related tine supports; and said flange means being provided with deflection surfaces for the control elements in order to position the control elements in the control cam means.

8. The hay harvesting machine as defined in claim 1, further including:

guide means for guiding each tine support rotatably about its lengthwise axis and securing each such tine support against axial displacement; and said guide means being secured pivotably at the rotatable portion about the pivot shaft means.

9. The hay harvesting machine as defined in claim 8, wherein:

said pivot shaft means is constituted by a bolt which is retained in said rotatable portion; and said bolt being mounted at said guide means.

10. The hay harvesting machine as defined in claim 9, wherein:

said bolt is fixedly retained at said rotatable portion.

11. The hay harvesting machine as defined in claim 9, wherein:

said bolt is rotatably retained at said rotatable portion.

12. The hay harvesting machine as defined in claim 9, wherein:

said guide means being pivotably mounted at said bolt.

13. The hay harvesting machine as defined in claim 9, wherein:

said guide means is fixedly mounted at said bolt.

14. The hay harvesting machine as defined in claim 1, wherein:

said arresting means comprise two arresting devices arranged at different elevational positions provided for each tine support and co-rotating with the tine supports; and said arresting devices serving for arresting the related tine support selectively in each one of its pivotal positions.

15. The hay harvesting machine as defined in claim 14, wherein:

one of the arresting devices serves for arresting the tine support in its second pivotal position decoupled from the control track means; and said one arresting device possessing a fixedly retained arresting pin which piercingly extends through the tine support.

* * * * *